US009069929B2

(12) United States Patent
Borland et al.

(10) Patent No.: US 9,069,929 B2
(45) Date of Patent: Jun. 30, 2015

(54) ARBITRATING USAGE OF SERIAL PORT IN NODE CARD OF SCALABLE AND MODULAR SERVERS

(75) Inventors: David Borland, Austin, TX (US); Arnold Thomas Schnell, Pflugerville, TX (US); Mark Davis, Austin, TX (US)

(73) Assignee: III Holdings 2, LLC, Wilmington, DE (US)

(*) Notice: Subject to any disclaimer, the term of this patent is extended or adjusted under 35 U.S.C. 154(b) by 121 days.

(21) Appl. No.: 13/527,498

(22) Filed: Jun. 19, 2012

(65) Prior Publication Data

US 2013/0111229 A1    May 2, 2013

Related U.S. Application Data

(60) Provisional application No. 61/553,555, filed on Oct. 31, 2011.

(51) Int. Cl.
G06F 1/32 (2006.01)
G06F 15/78 (2006.01)

(52) U.S. Cl.
CPC ......... *G06F 15/7803* (2013.01); *Y02B 60/1207* (2013.01); *Y02B 60/1225* (2013.01)

(58) Field of Classification Search
CPC .................................................. G06F 1/3203
USPC ........................................................ 713/300
See application file for complete search history.

(56) References Cited

U.S. PATENT DOCUMENTS

| 5,451,936 A | 9/1995 | Yang et al. |
| 5,594,908 A | 1/1997 | Hyatt |
| 5,623,641 A | 4/1997 | Kadoyashiki |
| 5,781,187 A | 7/1998 | Gephardt et al. |
| 5,901,048 A | 5/1999 | Hu |
| 5,908,468 A | 6/1999 | Hartmann |
| 5,968,176 A | 10/1999 | Nessett et al. |
| 5,971,804 A | 10/1999 | Gallagher et al. |
| 6,141,214 A | 10/2000 | Ahn |
| 6,181,699 B1 | 1/2001 | Crinion et al. |
| 6,192,414 B1 | 2/2001 | Horn |
| 6,314,501 B1 | 11/2001 | Gulick et al. |
| 6,373,841 B1 | 4/2002 | Goh et al. |
| 6,446,192 B1 | 9/2002 | Narasimhan et al. |
| 6,452,809 B1 * | 9/2002 | Jackson et al. ................ 361/796 |
| 6,507,586 B1 | 1/2003 | Satran et al. |

(Continued)

FOREIGN PATENT DOCUMENTS

| JP | 2005-223753 | 8/2005 |
| JP | 2005-536960 | 12/2005 |

(Continued)

OTHER PUBLICATIONS

Fpga4Fn.com, "What is JTAG", Jan. 31, 2010.*

(Continued)

*Primary Examiner* — Thomas Lee
*Assistant Examiner* — Santosh R Poudel

(57) ABSTRACT

A node card includes a substrate having a connector that communicates a plurality of signals between the substrate and an outside entity. One or more nodes are connected to the substrate, and the one or more nodes receive power from one or more signals communicated over the connector. The one or more nodes also communicate with the outside entity using the one or more signals communicated over the connector.

29 Claims, 5 Drawing Sheets

(56) References Cited

U.S. PATENT DOCUMENTS

| | | |
|---|---|---|
| 6,574,238 B1 | 6/2003 | Thrysoe |
| 6,711,691 B1 | 3/2004 | Howard et al. |
| 6,766,389 B2 | 7/2004 | Hayter et al. |
| 6,813,676 B1 | 11/2004 | Henry et al. |
| 6,816,750 B1 | 11/2004 | Klaas |
| 6,842,430 B1 | 1/2005 | Melnik |
| 6,857,026 B1 | 2/2005 | Cain |
| 6,963,926 B1 | 11/2005 | Robinson |
| 6,963,948 B1 | 11/2005 | Gulick |
| 6,977,939 B2 | 12/2005 | Joy et al. |
| 6,988,170 B2 | 1/2006 | Barroso et al. |
| 6,990,063 B1 | 1/2006 | Lenoski et al. |
| 7,020,695 B1 | 3/2006 | Kundu et al. |
| 7,032,119 B2 | 4/2006 | Fung |
| 7,080,078 B1 | 7/2006 | Slaughter et al. |
| 7,080,283 B1 | 7/2006 | Songer et al. |
| 7,143,153 B1 | 11/2006 | Black et al. |
| 7,165,120 B1 * | 1/2007 | Giles et al. ............... 709/249 |
| 7,170,315 B2 | 1/2007 | Bakker et al. |
| 7,203,063 B2 | 4/2007 | Bash et al. |
| 7,257,655 B1 * | 8/2007 | Burney et al. ............. 710/105 |
| 7,263,288 B1 | 8/2007 | Islam |
| 7,274,705 B2 | 9/2007 | Chang et al. |
| 7,278,582 B1 | 10/2007 | Siegel et al. |
| 7,310,319 B2 | 12/2007 | Awsienko et al. |
| 7,325,050 B2 | 1/2008 | O'Connor et al. |
| 7,337,333 B2 | 2/2008 | O'Conner et al. |
| 7,340,777 B1 | 3/2008 | Szor |
| 7,353,362 B2 | 4/2008 | Georgiou et al. |
| 7,382,154 B2 | 6/2008 | Ramos et al. |
| 7,386,888 B2 | 6/2008 | Liang et al. |
| 7,418,534 B2 | 8/2008 | Hayter et al. |
| 7,437,540 B2 | 10/2008 | Paolucci et al. |
| 7,447,147 B2 | 11/2008 | Nguyen et al. |
| 7,447,197 B2 | 11/2008 | Terrell et al. |
| 7,466,712 B2 | 12/2008 | Makishima et al. |
| 7,467,306 B2 | 12/2008 | Cartes et al. |
| 7,467,358 B2 | 12/2008 | Kang et al. |
| 7,502,884 B1 | 3/2009 | Shah et al. |
| 7,519,843 B1 | 4/2009 | Buterbaugh et al. |
| 7,555,666 B2 | 6/2009 | Brundridge et al. |
| 7,583,661 B2 | 9/2009 | Chaudhuri |
| 7,586,841 B2 | 9/2009 | Vasseur |
| 7,596,144 B2 | 9/2009 | Pong |
| 7,599,360 B2 | 10/2009 | Edsall et al. |
| 7,606,225 B2 | 10/2009 | Xie et al. |
| 7,606,245 B2 | 10/2009 | Ma et al. |
| 7,616,646 B1 | 11/2009 | Ma et al. |
| 7,620,057 B1 | 11/2009 | Aloni et al. |
| 7,657,677 B2 * | 2/2010 | Huang et al. ............... 710/100 |
| 7,657,756 B2 | 2/2010 | Hall |
| 7,660,922 B2 | 2/2010 | Harriman |
| 7,673,164 B1 | 3/2010 | Agarwal |
| 7,710,936 B2 | 5/2010 | Morales Barroso |
| 7,719,834 B2 | 5/2010 | Miyamoto et al. |
| 7,751,433 B2 | 7/2010 | Dollo et al. |
| 7,760,720 B2 | 7/2010 | Pullela et al. |
| 7,761,687 B2 | 7/2010 | Blumrich et al. |
| 7,783,910 B2 * | 8/2010 | Felter et al. ............... 713/340 |
| 7,791,894 B2 * | 9/2010 | Bechtolsheim ............... 361/752 |
| 7,792,113 B1 | 9/2010 | Foschiano et al. |
| 7,796,399 B2 | 9/2010 | Clayton et al. |
| 7,801,132 B2 | 9/2010 | Ofek et al. |
| 7,802,017 B2 * | 9/2010 | Uemura et al. ............... 709/250 |
| 7,831,839 B2 | 11/2010 | Hatakeyama |
| 7,840,703 B2 | 11/2010 | Arimilli et al. |
| 7,865,614 B2 | 1/2011 | Lu et al. |
| 7,925,795 B2 | 4/2011 | Tamir et al. |
| 7,975,110 B1 * | 7/2011 | Spaur et al. ............... 711/152 |
| 7,991,817 B2 | 8/2011 | Dehon et al. |
| 7,991,922 B2 | 8/2011 | Hayter et al. |
| 7,992,151 B2 | 8/2011 | Warrier et al. |
| 8,019,832 B2 | 9/2011 | De Sousa et al. |
| 8,060,760 B2 | 11/2011 | Shetty et al. |
| 8,060,775 B1 | 11/2011 | Sharma et al. |
| 8,082,400 B1 | 12/2011 | Chang et al. |
| 8,108,508 B1 | 1/2012 | Goh et al. |
| 8,122,269 B2 | 2/2012 | Houlihan et al. |
| 8,132,034 B2 | 3/2012 | Lambert et al. |
| 8,156,362 B2 | 4/2012 | Branover et al. |
| 8,165,120 B2 | 4/2012 | Maruccia et al. |
| 8,170,040 B2 | 5/2012 | Konda |
| 8,180,996 B2 | 5/2012 | Fullerton et al. |
| 8,189,612 B2 | 5/2012 | Lemaire et al. |
| 8,199,636 B1 | 6/2012 | Rouyer et al. |
| 8,205,103 B2 | 6/2012 | Kazama et al. |
| 8,379,425 B2 * | 2/2013 | Fukuoka et al. ............... 363/147 |
| 8,397,092 B2 | 3/2013 | Karnowski |
| RE44,610 E | 11/2013 | Krakirian et al. |
| 8,599,863 B2 | 12/2013 | Davis |
| 8,684,802 B1 | 4/2014 | Gross et al. |
| 8,745,275 B2 * | 6/2014 | Ikeya et al. ............... 710/3 |
| 8,745,302 B2 | 6/2014 | Davis et al. |
| 8,782,321 B2 | 7/2014 | Harriman et al. |
| 8,824,485 B2 | 9/2014 | Biswas et al. |
| 8,854,831 B2 | 10/2014 | Arnouse |
| 2002/0004912 A1 | 1/2002 | Fung |
| 2002/0040391 A1 | 4/2002 | Chaiken et al. |
| 2002/0083352 A1 * | 6/2002 | Fujimoto et al. ............... 713/300 |
| 2002/0097732 A1 | 7/2002 | Worster et al. |
| 2002/0107903 A1 | 8/2002 | Richter et al. |
| 2002/0124128 A1 * | 9/2002 | Qiu ............... 710/302 |
| 2002/0159452 A1 | 10/2002 | Foster et al. |
| 2002/0186656 A1 | 12/2002 | Vu |
| 2002/0194412 A1 * | 12/2002 | Bottom ............... 710/302 |
| 2003/0007493 A1 | 1/2003 | Oi et al. |
| 2003/0033547 A1 * | 2/2003 | Larson et al. ............... 713/300 |
| 2003/0041266 A1 | 2/2003 | Ke et al. |
| 2003/0076832 A1 | 4/2003 | Ni |
| 2003/0093255 A1 | 5/2003 | Freyensee et al. |
| 2003/0093624 A1 | 5/2003 | Arimilli et al. |
| 2003/0110262 A1 | 6/2003 | Hasan et al. |
| 2003/0140190 A1 | 7/2003 | Mahony et al. |
| 2003/0158940 A1 | 8/2003 | Leigh |
| 2003/0159083 A1 | 8/2003 | Fukuhara et al. |
| 2003/0172191 A1 * | 9/2003 | Williams ............... 709/253 |
| 2003/0193402 A1 | 10/2003 | Post et al. |
| 2003/0202520 A1 | 10/2003 | Witkowski et al. |
| 2003/0231624 A1 | 12/2003 | Alappat et al. |
| 2004/0030938 A1 | 2/2004 | Barr et al. |
| 2004/0068676 A1 * | 4/2004 | Larson et al. ............... 714/31 |
| 2004/0111612 A1 | 6/2004 | Choi et al. |
| 2004/0141521 A1 | 7/2004 | George |
| 2004/0165588 A1 | 8/2004 | Pandya |
| 2004/0210693 A1 | 10/2004 | Zeitler et al. |
| 2004/0215864 A1 | 10/2004 | Arimilli et al. |
| 2004/0215991 A1 | 10/2004 | McAfee et al. |
| 2004/0267486 A1 | 12/2004 | Percer et al. |
| 2005/0015378 A1 | 1/2005 | Gammel et al. |
| 2005/0018604 A1 | 1/2005 | Dropps et al. |
| 2005/0018606 A1 | 1/2005 | Dropps et al. |
| 2005/0018663 A1 | 1/2005 | Dropps et al. |
| 2005/0021606 A1 * | 1/2005 | Davies et al. ............... 709/203 |
| 2005/0030954 A1 | 2/2005 | Dropps et al. |
| 2005/0033742 A1 | 2/2005 | Kamvar et al. |
| 2005/0033890 A1 | 2/2005 | Lee |
| 2005/0044195 A1 | 2/2005 | Westfall |
| 2005/0077921 A1 * | 4/2005 | Percer et al. ............... 326/86 |
| 2005/0105538 A1 | 5/2005 | Perera et al. |
| 2005/0240688 A1 | 10/2005 | Moerman et al. |
| 2006/0013218 A1 | 1/2006 | Shore et al. |
| 2006/0029053 A1 | 2/2006 | Roberts et al. |
| 2006/0090025 A1 | 4/2006 | Tufford et al. |
| 2006/0136570 A1 | 6/2006 | Pandya |
| 2006/0140211 A1 * | 6/2006 | Huang et al. ............... 370/466 |
| 2006/0174342 A1 | 8/2006 | Zaheer et al. |
| 2006/0248359 A1 | 11/2006 | Fung |
| 2006/0259734 A1 | 11/2006 | Sheu et al. |
| 2006/0265609 A1 * | 11/2006 | Fung ............... 713/300 |
| 2007/0006001 A1 * | 1/2007 | Isobe et al. ............... 713/300 |
| 2007/0076653 A1 | 4/2007 | Park et al. |
| 2007/0094486 A1 * | 4/2007 | Moore et al. ............... 713/1 |
| 2007/0109968 A1 | 5/2007 | Hussain et al. |
| 2007/0130397 A1 | 6/2007 | Tsu |

(56) References Cited

U.S. PATENT DOCUMENTS

| | | | |
|---|---|---|---|
| 2007/0180310 A1 | 8/2007 | Johnson et al. | |
| 2007/0226795 A1 | 9/2007 | Conti et al. | |
| 2007/0280230 A1 | 12/2007 | Park | |
| 2007/0286009 A1* | 12/2007 | Norman | 365/230.03 |
| 2007/0288585 A1 | 12/2007 | Sekiguchi et al. | |
| 2008/0013453 A1 | 1/2008 | Chiang et al. | |
| 2008/0040463 A1 | 2/2008 | Brown et al. | |
| 2008/0052437 A1 | 2/2008 | Loffink et al. | |
| 2008/0059782 A1* | 3/2008 | Kruse et al. | 713/1 |
| 2008/0075089 A1 | 3/2008 | Evans et al. | |
| 2008/0089358 A1* | 4/2008 | Basso et al. | 370/465 |
| 2008/0104264 A1 | 5/2008 | Duerk et al. | |
| 2008/0140771 A1 | 6/2008 | Vass et al. | |
| 2008/0140930 A1 | 6/2008 | Hotchkiss | |
| 2008/0159745 A1 | 7/2008 | Segal | |
| 2008/0162691 A1 | 7/2008 | Zhang et al. | |
| 2008/0183882 A1 | 7/2008 | Flynn et al. | |
| 2008/0186965 A1 | 8/2008 | Zheng et al. | |
| 2008/0199133 A1 | 8/2008 | Takizawa et al. | |
| 2008/0212273 A1* | 9/2008 | Bechtolsheim | 361/685 |
| 2008/0212276 A1* | 9/2008 | Bottom et al. | 361/686 |
| 2008/0217021 A1 | 9/2008 | Lembcke et al. | |
| 2008/0222434 A1 | 9/2008 | Shimizu et al. | |
| 2008/0235443 A1 | 9/2008 | Chow et al. | |
| 2008/0243634 A1 | 10/2008 | Dworkin et al. | |
| 2008/0250181 A1 | 10/2008 | Li et al. | |
| 2008/0259555 A1* | 10/2008 | Bechtolsheim et al. | 361/686 |
| 2008/0259788 A1 | 10/2008 | Wang et al. | |
| 2008/0266793 A1 | 10/2008 | Lee | |
| 2008/0288660 A1* | 11/2008 | Balasubramanian et al. | 710/2 |
| 2008/0288664 A1 | 11/2008 | Pettey et al. | |
| 2008/0288683 A1 | 11/2008 | Ramey | |
| 2008/0301794 A1 | 12/2008 | Lee | |
| 2008/0313369 A1 | 12/2008 | Verdoorn et al. | |
| 2008/0320161 A1 | 12/2008 | Maruccia et al. | |
| 2009/0021907 A1 | 1/2009 | Mann et al. | |
| 2009/0044036 A1 | 2/2009 | Merkin | |
| 2009/0064287 A1 | 3/2009 | Bagepalli et al. | |
| 2009/0080428 A1 | 3/2009 | Witkowski et al. | |
| 2009/0097200 A1 | 4/2009 | Sharma et al. | |
| 2009/0113130 A1* | 4/2009 | He et al. | 711/118 |
| 2009/0133129 A1 | 5/2009 | Jeong et al. | |
| 2009/0135751 A1 | 5/2009 | Hodges et al. | |
| 2009/0135835 A1 | 5/2009 | Gallatin et al. | |
| 2009/0158070 A1 | 6/2009 | Gruendler | |
| 2009/0172423 A1 | 7/2009 | Song et al. | |
| 2009/0198958 A1 | 8/2009 | Arimilli et al. | |
| 2009/0204834 A1 | 8/2009 | Hendin et al. | |
| 2009/0204837 A1 | 8/2009 | Raval et al. | |
| 2009/0219827 A1 | 9/2009 | Chen et al. | |
| 2009/0222884 A1 | 9/2009 | Shaji et al. | |
| 2009/0225751 A1 | 9/2009 | Koenck et al. | |
| 2009/0235104 A1* | 9/2009 | Fung | 713/324 |
| 2009/0248943 A1* | 10/2009 | Jiang et al. | 710/313 |
| 2009/0259863 A1* | 10/2009 | Williams et al. | 713/323 |
| 2009/0259864 A1* | 10/2009 | Li et al. | 713/323 |
| 2009/0265045 A1 | 10/2009 | Coxe, III | |
| 2009/0271656 A1 | 10/2009 | Yokota et al. | |
| 2009/0276666 A1* | 11/2009 | Haley et al. | 714/47 |
| 2009/0279518 A1 | 11/2009 | Falk et al. | |
| 2009/0282274 A1 | 11/2009 | Langgood et al. | |
| 2009/0282419 A1 | 11/2009 | Mejdrich et al. | |
| 2010/0005331 A1 | 1/2010 | Somasundaram et al. | |
| 2010/0008038 A1 | 1/2010 | Coglitore | |
| 2010/0008365 A1 | 1/2010 | Porat | |
| 2010/0026408 A1 | 2/2010 | Shau | |
| 2010/0040053 A1 | 2/2010 | Gottumukkula et al. | |
| 2010/0049822 A1 | 2/2010 | Davies et al. | |
| 2010/0051391 A1* | 3/2010 | Jahkonen | 187/393 |
| 2010/0106987 A1 | 4/2010 | Lambert et al. | |
| 2010/0118880 A1 | 5/2010 | Kunz et al. | |
| 2010/0125742 A1 | 5/2010 | Ohtani | |
| 2010/0125915 A1 | 5/2010 | Hall et al. | |
| 2010/0138481 A1 | 6/2010 | Behrens | |
| 2010/0161909 A1 | 6/2010 | Nation et al. | |
| 2010/0165983 A1 | 7/2010 | Aybay et al. | |
| 2010/0169479 A1 | 7/2010 | Jeong et al. | |
| 2010/0220732 A1 | 9/2010 | Hussain et al. | |
| 2010/0250914 A1* | 9/2010 | Abdul et al. | 713/100 |
| 2010/0265650 A1* | 10/2010 | Chen et al. | 361/679.33 |
| 2010/0299548 A1* | 11/2010 | Chadirchi et al. | 713/340 |
| 2010/0308897 A1 | 12/2010 | Evoy et al. | |
| 2010/0312910 A1 | 12/2010 | Lin et al. | |
| 2010/0312969 A1 | 12/2010 | Yamazaki et al. | |
| 2010/0318812 A1 | 12/2010 | Auradkar et al. | |
| 2011/0023104 A1 | 1/2011 | Franklin | |
| 2011/0026397 A1 | 2/2011 | Saltsidis et al. | |
| 2011/0075369 A1* | 3/2011 | Sun et al. | 361/700 |
| 2011/0090633 A1 | 4/2011 | Rabinovitz | |
| 2011/0103391 A1 | 5/2011 | Davis et al. | |
| 2011/0119344 A1 | 5/2011 | Eustis | |
| 2011/0123014 A1 | 5/2011 | Smith | |
| 2011/0138046 A1 | 6/2011 | Bonnier et al. | |
| 2011/0191514 A1* | 8/2011 | Wu et al. | 710/301 |
| 2011/0191610 A1 | 8/2011 | Agarwal et al. | |
| 2011/0210975 A1* | 9/2011 | Wong et al. | 345/503 |
| 2011/0271159 A1* | 11/2011 | Ahn et al. | 714/724 |
| 2011/0273840 A1 | 11/2011 | Chen | |
| 2011/0295991 A1 | 12/2011 | Aida | |
| 2011/0296141 A1 | 12/2011 | Daffron | |
| 2011/0320690 A1 | 12/2011 | Petersen et al. | |
| 2012/0020207 A1 | 1/2012 | Corti et al. | |
| 2012/0050981 A1* | 3/2012 | Xu et al. | 361/679.33 |
| 2012/0054469 A1* | 3/2012 | Ikeya et al. | 712/29 |
| 2012/0081850 A1* | 4/2012 | Regimbal et al. | 361/679.02 |
| 2012/0096211 A1 | 4/2012 | Davis et al. | |
| 2012/0099265 A1 | 4/2012 | Reber | |
| 2012/0131201 A1 | 5/2012 | Matthews et al. | |
| 2012/0155168 A1* | 6/2012 | Kim et al. | 365/185.03 |
| 2012/0198252 A1* | 8/2012 | Kirschtein et al. | 713/310 |
| 2012/0297042 A1 | 11/2012 | Davis et al. | |
| 2013/0094499 A1 | 4/2013 | Davis et al. | |
| 2013/0097448 A1 | 4/2013 | Davis et al. | |
| 2013/0148667 A1 | 6/2013 | Hama et al. | |
| 2013/0163605 A1 | 6/2013 | Chandra et al. | |
| 2013/0290650 A1 | 10/2013 | Chang et al. | |
| 2015/0039840 A1 | 2/2015 | Chandra et al. | |

FOREIGN PATENT DOCUMENTS

| | | |
|---|---|---|
| WO | WO-2004/021641 | 3/2004 |
| WO | WO-2005/013143 | 2/2005 |
| WO | WO-2008/000193 | 1/2008 |
| WO | WO-2011/044271 | 4/2011 |
| WO | WO-2012/037494 | 3/2012 |

OTHER PUBLICATIONS

Janesen et al. "SATA-IO—to Develop Specification for Mini Interface Connector", Sep. 21, 2009. Serial ATA.*
PCT International Search Report of PCT/US12/62608; dated Jan. 18, 2013.
PCT Written Opinion of the International Searching Authority of PCT/US12/62608; dated Jan. 18, 2013.
Non-Final Office Action on U.S. Appl. No. 12/889,721, mailed Sep. 29, 2014.
Advanced Switching Technology Tech Brief, published 2005, 2 pages.
Chapter 1 Overview of the Origin Family Architecture from Origin and Onyx2 Theory of Operations Manual, published 1997, 18 pages.
Cisco MDS 9000 Family Multiprotocol Services Module, published 2006, 13 pages.
Comparing the I2C BUS to the SMBUS, Maxim Integrated, Dec. 1, 2000, p. 1.
Deering, "IP Multicast Extensions for 4.3BSD UNIX and related Systems," Jun. 1999, 5 pages.
Extended European Search Report for EP 10827330.1, mailed Jun. 5, 2013.
Final Office Action on U.S. Appl. No. 12/889,721, mailed Apr. 17, 2014.
Final Office Action on U.S. Appl. No. 12/794,996, mailed Jun. 19, 2013.

(56) References Cited

OTHER PUBLICATIONS

Final Office Action on U.S. Appl. No. 13/624,725, mailed Nov. 13, 2013.
Final Office Action on U.S. Appl. No. 13/624,731, mailed Jul. 25, 2014.
Final Office Action on U.S. Appl. No. 13/705,340, mailed Aug. 2, 2013.
Final Office Action on U.S. Appl. No. 13/705,414, mailed Aug. 9, 2013.
Final Office Action on U.S. Appl. No. 13/624,731, mailed Nov. 12, 2013.
From AT to BTX: Motherboard Form Factor, Webopedia, Apr. 29, 2005, p. 1.
HP Virtual Connect Traffic Flow—Technology brief, Jan. 2012, 22 pages.
International Preliminary Report on Patentability for PCT/US2009/044200, mailed Nov. 17, 2010.
International Preliminary Report on Patentability for PCT/US2012/038986 issued on Nov. 26, 2013.
International Preliminary Report on Patentability for PCT/US2012/061747, mailed Apr. 29, 2014.
International Preliminary Report on Patentability issued on PCT/US12/62608, issued May 6, 2014.
International Search Report and Written Opinion for PCT/US12/38987, mailed Aug. 16, 2012.
International Search Report and Written Opinion for PCT/US12/61747, mailed Mar. 1, 2013.
International Search Report and Written Opinion for PCT/US2010/053227, mailed May 10, 2012.
International Search Report and Written Opinion for PCT/US2011/051996, mailed Jan. 19, 2012.
International Search Report and Written Opinion on PCT/US09/44200, mailed Jul. 1, 2009.
International Search Report and Written Opinion on PCT/US2012/038986, mailed Mar. 14, 2013.
Nawathe et al., "Implementation of an 8-Core, 64-Thread, Power Efficient SPARC Server on a Chip", IEEE Journal of Solid-State Circuits, vol. 43, No. 1, Jan. 2008, pp. 6-20.
Non-Final Action on U.S. Appl. No. 13/728,362, mailed Feb. 21, 2014.
Non-Final Office Action on U.S. Appl. No. 12/889,721, mailed Jul. 2, 2013.
Non-Final Office Action on U.S. Appl. No. 13/475,722, mailed Jan. 17, 2014.
Non-Final Office Action on U.S. Appl. No. 12/794,996, mailed Sep. 17, 2012.
Non-Final Office Action on U.S. Appl. No. 12/889,721, mailed Oct. 11, 2012.
Non-Final Office Action on U.S. Appl. No. 13/284,855, mailed Dec. 19, 2013.
Non-Final Office Action on U.S. Appl. No. 13/453,086, mailed Mar. 12, 2013.
Non-Final Office Action on U.S. Appl. No. 13/475,713, mailed Apr. 1, 2014.
Non-Final Office Action on U.S. Appl. No. 13/527,505, mailed May 8, 2014.
Non-Final Office Action on U.S. Appl. No. 13/624,725, mailed Jan. 10, 2013.
Non-final office action on U.S. Appl. No. 13/624,731 mailed Jan. 29, 2013.
Non-Final Office Action on U.S. Appl. No. 13/692,741, mailed Sep. 4, 2014.
Non-Final Office Action on U.S. Appl. No. 13/705,286, mailed May 13, 2013.
Non-Final Office Action on U.S. Appl. No. 13/705,340, mailed Mar. 12, 2014.
Non-Final Office Action on U.S. Appl. No. 13/705,340, mailed Mar. 29, 2013.
Non-Final Office Action on U.S. Appl. No. 13/705,414, mailed Apr. 9, 2013.
Non-Final Office Action on U.S. Appl. No. 13/705,428, mailed Jul. 10, 2013.
Notice of Allowance on U.S. Appl. No. 13/453,086, mailed Jul. 18, 2013.
Notice of Allowance on U.S. Appl. No. 13/705,386, mailed Jan. 24, 2014.
Notice of Allowance on U.S. Appl. No. 13/705,414, mailed Nov. 4, 2013.
Notice of Allowance on U.S. Appl. No. 13/284,855, mailed Jul. 14, 2014.
Venaas, "IPv4 Multicast Address Space Registry," 2013, http://www.iana.org/assignments/multicast-addresses/multicast-addresses.xhtml.
Elghany et al.,j "High Throughput High Performance NoC Switch," NORCHIP 2008, Nov. 2008, pp. 237-240.
Grecu et al., "A Scalable Communication-Centric SoC Interconnect Architecture" Proceedings 5th International Symposium on Quality Electronic Design, 2005, pp. 343, 348 (full article included).
Hossain et al., "Extended Butterfly Fat Tree Interconnection (EFTI) Architecture for Network on CHIP," 2005 IEEE Pacific Rim Conference on Communications, Computers and Signal Processing, Aug. 2005, pp. 613-616.
Non-Final Office Action on U.S. Appl. No. 14/334,931, mailed Jan. 5, 2015.
Pande et al., "Design of a Switch for Network on Chip Applications," May 25-28, 2003 Proceedings of the 2003 International Symposium on Circuits and Systems, vol. 5, pp. V217-V220.
Final Office Action on U.S. Appl. No. 13/527,505, mailed Dec. 5, 2014.
Notice of Allowance on U.S. Appl. No. 13/705,340, mailed Dec. 3, 2014.
Final Office Action on U.S. Appl. No. 13/475,713, mailed Oct. 17, 2014.
Final Office Action on U.S. Appl. No. 13/475,722, mailed Oct. 20, 2014.
Non-Final Office Action on U.S. Appl. No. 13/234,054, mailed Oct. 23, 2014.
Non-Final Office Action on U.S. Appl. No. 13/662,759, mailed Nov. 6, 2014.
Non-Final Office Action on U.S. Appl. No. 14/106,698, mailed Feb. 12, 2015.
Notice of Allowance on U.S. Appl. No. 13/475,713, mailed Feb. 5, 2015.
Reexamination Report on Japanese Application 2012-536877, mailed Jan. 22, 2015 (English Translation not available).
Search Report on EP Application 10827330.1, mailed Feb. 12, 2015.
Final Office Action on U.S. Appl. No. 13/692,741, mailed Mar. 11, 2015.
Notice of Allowance on U.S. Appl. No. 13/475,722, mailed Feb. 27, 2015.
Notice of Allowance on U.S. Appl. No. 13/527,505, mailed Mar. 6, 2015.
Notice of Allowance on U.S. Appl. No. 13/624,731, mailed Mar. 5, 2015.
Final Office Action on U.S. Appl. No. 13/234,054, mailed Apr. 16, 2015.
Non-Final Office Action on U.S. Appl. No. 13/728,308, mailed May 14, 2015.
Non-Final Office Action on U.S. Appl. No. 13/624,725, mailed Apr. 23, 2015.
Non-Final Office Action on U.S. Appl. No. 14/052,723, mailed May 1, 2015.

\* cited by examiner

ARBITRATING USAGE OF SERIAL PORT IN NODE CARD OF SCALABLE AND MODULAR SERVERS

RELATED APPLICATION/PRIORITY CLAIMS

This application claims the benefit under 35 USC 119(e) of U.S. Provisional Patent Application Ser. No. 61/553,555 filed on Oct. 31, 2011 and entitled "System And Method For Modular Compute Provisioning In Large Scalable Processor Installations", the entirety of which is incorporated herein by reference.

This application is also related to U.S. patent application Ser. No. 13/527,505, filed on the same date and entitled "System Board For System And Method For Modular Compute Provisioning In Large Scalable Processor Installations", the entirety of which is also incorporated herein by reference.

FIELD

The disclosure relates generally to provisioning of modular compute resources within a system design.

BACKGROUND

Server systems generally provide a fixed number of options. For example, there are usually a fixed number of CPU sockets, memory DIMM slots, PCI Express IO slots and a fixed number of hard drive bays, which often are delivered empty as they provide future upgradability. The customer is expected to gauge future needs and select a server chassis category that will serve present and future needs. Historically, and particularly with x86-class servers, predicting the future needs has been achievable because product improvements from one generation to another have been incremental.

With the advent of power optimized, scalable servers, the ability to predict future needs has become less obvious. For example, in this class of high-density, low-power servers within a 2U chassis, it is possible to install on the order of 120 compute nodes in an incremental fashion. Using this server as a data storage device, the user may require only 4 compute nodes, but may desire 80 storage drives. Using the same server as a pure compute function focused on analytics, the user may require 120 compute nodes and no storage drives. The nature of scalable servers lends itself to much more diverse applications which require diverse system configurations. As the diversity increases over time, the ability to predict the system features that must scale becomes increasingly difficult.

It is desirable to provide smaller sub-units of a computer system that are modular and can be connected to each other to form larger, highly configurable scalable servers. Thus, it is desirable to create a system and method to modularly scale compute resources in these power-optimized, high density, scalable servers.

DETAILED DESCRIPTION OF ONE OR MORE EMBODIMENTS

The disclosure is particularly applicable to examples of the node cards illustrated and described below and it is in this context that the disclosure will be described. It will be appreciated, however, that the disclosure has broader applicability since the disclosed system and node cards can be implemented in different manners that are within the scope of the disclosure and may be used for any application since all of the various applications in which the system and node cards may be used are within the scope of the disclosure.

Figure 1:
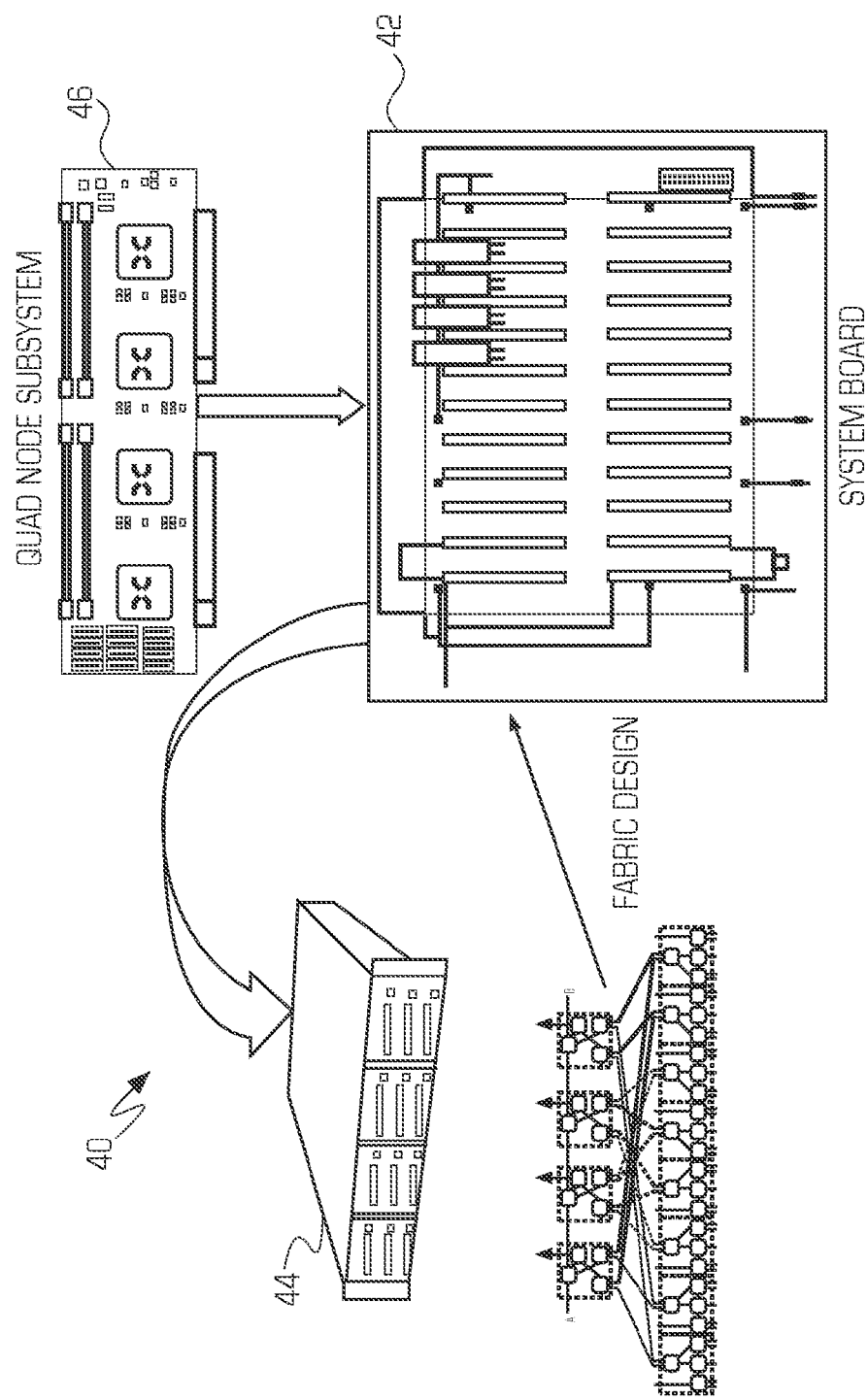
FIG. 1 illustrates an example of a system board on which one or more node cards may be installed.

FIG. 1 illustrates an example of a system 40 that may include a system board 42 on which one or more node cards 46 may be installed. The system board 42 may be fit into a typical server chassis 44 and the system board may have the one or more node cards 46, such as one or more server node units (described below with reference to FIG. 2) plugged into the system board. There are a number of functions that are needed to complete a full classic server which includes Ethernet PHYs to interface the one or more ServerNodes 46 or a cluster of ServerNodes and server control functions (fan control, buttons etc. . . . ). The system board 42 is the component that ties the ServerNodes 46 to these components. The system board 42 is desirable if a hierarchical hardware partition is desired where the "building block" is smaller than the desired system, or when the "building block" is not standalone. The system board roles can include: Ethernet network connectivity, internal fabric connections between ServerNodes or groups a ServerNodes in a sub-system (the fabric design in FIG. 1) and chassis control and management. The system board is the component that connects the fabric links between ServerNodes and allows them to communicate with the external world. Once the fabric design, hardware partitioning and storage decisions have been made, the system board 42 can glue the system components together and the input/output (I/O) of the system may include: management data input/output (MDIO) for SFP communication, comboPHYs for internal fabric links, storage and Ethernet access, UART and JTAG ports for debug and SMBus and GPIOs for chassis component control and communication.

Now, several different examples of node cards that may be plugged into the system board are described in more detail. These node cards leverage highly integrated SoCs designed for Server applications, that enable density and system design options that has not been available to date. Cards can be defined that have the functionality of one or more servers and these Cards can be linked together to form clusters of servers in very dense implementations. A high level description of the Card would include a highly integrated SoC implementing the server functionality, DRAM memory, support circuitry such as voltage regulation, and clocks. The input/output of the card would be power and server to server interconnect and/or server to Ethernet PHY connectivity. SATA connections can also be added to interface to drives. An example of a node card is shown in FIG. 2 with one or more system on a chip (SoC) systems.

The fabric connections on each node card 46 can be designed to balance: usage of SoC PHYs, link redundancy, link bandwidth and flexibility in usage of the 8 links at the edge connectors. A node card 46 like that shown in FIG. 3 can be used in conjunction with a system board where the system board provides power to the node cards and connections to interconnect off the system board such as an Ethernet transceiver. The system board could house one or more node cards.

In the case of housing more than one node card, the system board creates a cluster of Servers that utilize a server to server interconnect or fabric that is integrated in the SoC or a separate function on the card. This system board can be made in many forms, including industry standard form factors such as ATX or in customer form factors. The system board could be a blade or could fit into a standard chassis such as a 2U or any other size.

Figure 2:
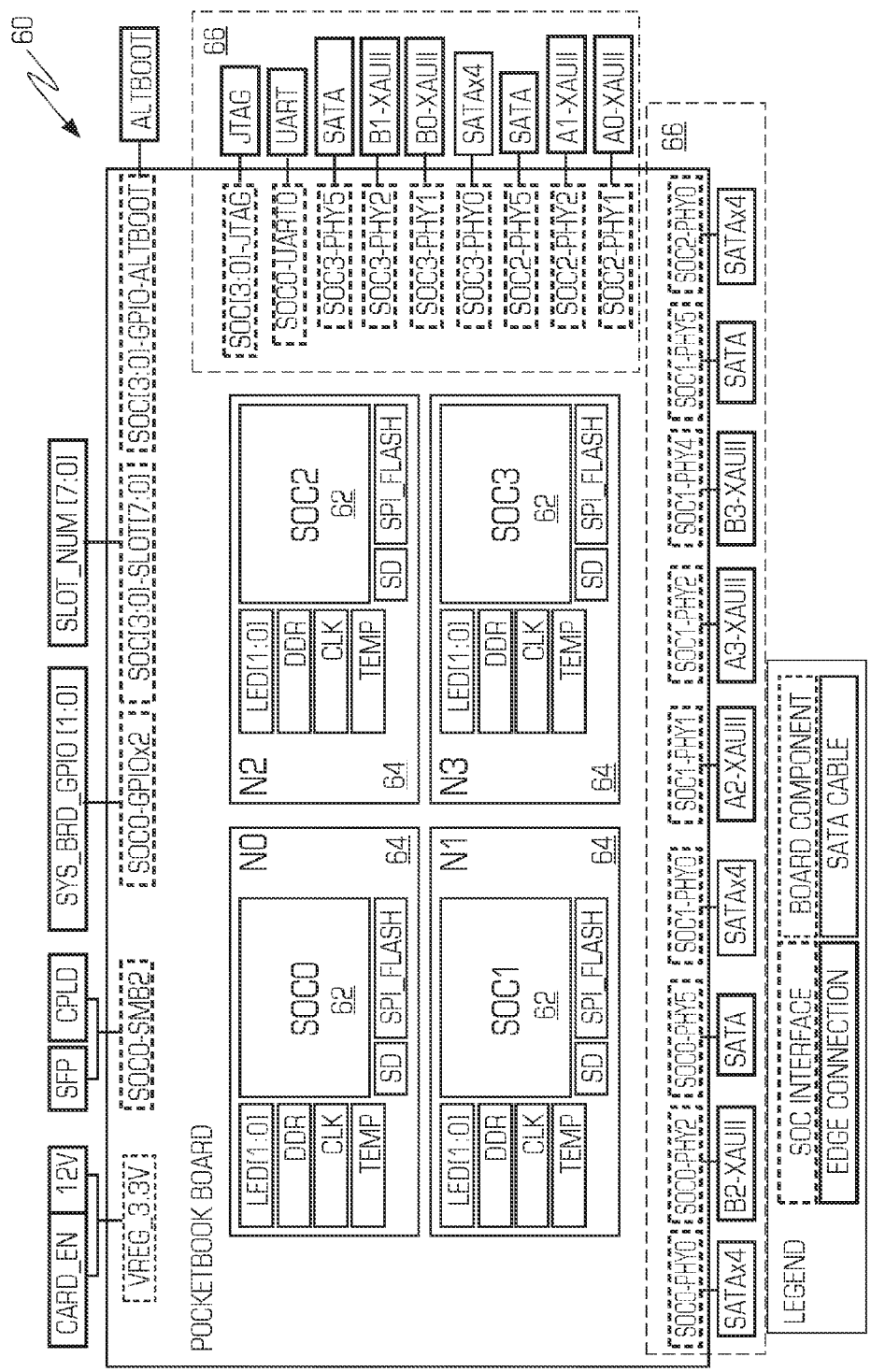
FIG. 2 illustrates an embodiment of the details of each node card.

FIG. 2 illustrates an example a node card 60. The node card may be a printed circuit board with a male physical connector, on which there is one or more servers that get power from some of the signals on the physical connector and use some of the signals on the connector for server to server communication or server to Ethernet PHY connections. In one embodiment, the physical connector may be PCIe connector. The node card may have an enable of the physical connector (see CARD_EN in FIG. 2) that enables the server. The node card may have regulators included on the PCB to provide regulated power supplies to various parts of the server off the power supply that is provided through one or more edge connectors, that may be implemented as PCIe connectors, and the enables (CARD_EN) may be connected to the regulators. The voltages on the node card may be 12V. The regulators may generate a common voltage that may be 3.3V (as shown in the example in FIG. 2), 1.8V, 0.9V and/or 1.35 or 1.5V. Each node card may have one or more SoCs 62, memory and appropriate regulators, but may also have multiple servers on the PCB including multiple SoC and multiple sets of DRAM and the DRAM is soldered on the PCB and signals are routed to the SoC. Alternatively, the DRAM is on a DIMM and the DIMM is connected to the PCB using a connector whose signals are routed to the SoC.

In the example in FIG. 2, the node card 60 may include one or more system on a chip (SOC) 62 (such as SOC0-SOC3 as shown in FIG. 2) and each SOC is part of a node 64, such as Node N0-N3 as shown, wherein the node may be a compute node, a storage node and the like. The SoCs on the node card may have heat sinks Each node 64 may further include one or more LEDs, memory (DDR, for example), a clock, a temperature sensor (TEMP) connected to the SoC, an SD slot and an SPI_FLASH slot as shown in FIG. 2. Thus, the node card may also have a storage card such as SD, uSD, MMC, eMMC that is connected to the SoC (as shown in the example below in FIG. 6). In one embodiment, a NAND or NOR can be used and connected to the SoC (such as in the examples in FIGS. 4-5 below) and/or a serial flash may be used and connected to the SoC.

The node card may also have one or more communication and/or storage connects 66, such as connects to various SATA devices, connects to XAUI interconnects and a UART that may be through an edge connector. In the node card, the server to server communication may be XAUI and one or more XAUI is routed to the edge connector and the XAUI signals are routed from the edge connector to the SoC and/or the XAUI signals are routed between SoCs on the PCB. In the node card, the server to server communication may be SGMII and one or more SGMII is routed to the edge connector and the SGMII signals are routed from the PCIe connector to the SoC or the SGMII signals are routed between SoCs on the PCB.

The node card may also have a SATA connector. The SATA signals may be routed from the SoC to the SATA connector or multiple SATA connectors are added to the PCB and multiple SATA connectors are routed from the SoC to the SATA connectors. The node card may also have a mini SATA on the Card or mSATA on the Card. The SATA may be routed to the edge connector from the SoC. In some embodiments, multiple SATA connections are made between the SoC and edge connector and PCIe x1 or x2, or x4, or x8 or x16 or x32 is used. The node card may use multiple edge connectors or any combination of multiple edge connectors such as x1 or x2, or x4, or x8 or x16 or x32. There may be a set of DC values, such as pull up and pull downs to set the slot identifier and the like and slow speed signals, and these DC values may be applied to the edge connector and routed onto the PCB for set up, control, ID or information and the DC values are routed to GPIOs on one or more SoCs.

The edge connector may also have signaling for JTAG and ALTBOOT (described below in more detail). The edge connector may also provide SLOT signaling, GPIO signaling and power (with an enable). The JTAG signals are routed from one or more SoCs to edge connector and the serial port and/or UART signals are routed from the edge connector to one or more SoCs. The SoC may have an addition signal or set of signals is routed to the edge connector that is used to arbitrate usage of the serial port or UART. In the system, a digital signal can be applied to the edge connector to cause an alternative boot procedure by connecting this signal from the edge connector to a signal on one or more SoCs that causes or enable an alternative boot. The digital signal or signals can be applied to the edge connector to cause an interrupt to the SoC or SoCs by connecting the SoC or SoCs to this digital signal on the connector. The system may have a level shifter(s) that is used on the PCB to translate a signal applied on the edge connector edge to a signal that is applied to the SoC(s). Furthermore, the digital signal that is routed from an SoC to the edge connector that resets and/or controls and/or provides info to an Ethernet phy or SFP that is not on the PCB and may be for reset, enable, disable, mdio, fault, los of signal and rate.

Figure 3:
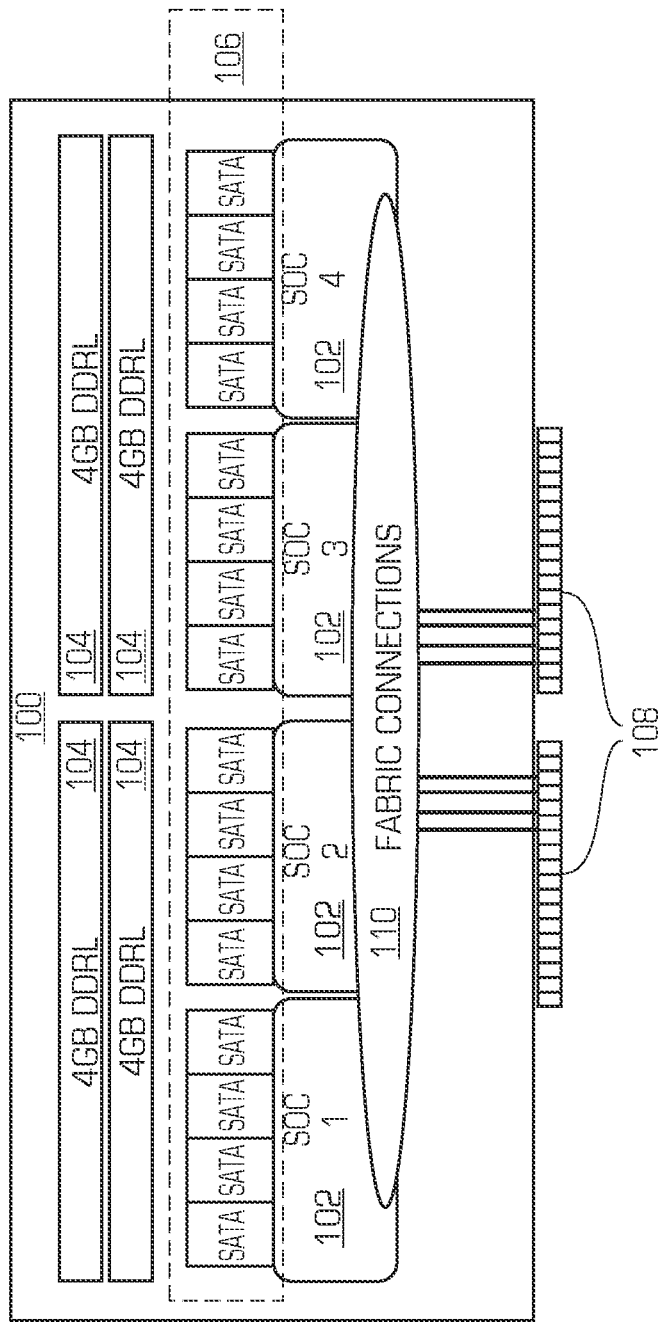
FIG. 3 illustrates an example of a quad node card.

FIG. 3 illustrates an example of a quad node card 100. The quad node card 100 may have one or more systems on a chip 102 (SoC0-SoC3 in this example), one or more volatile memory devices 104, such as four 4 GB DDR3 Mini-DIMMs (1 per node) or DDR3L memory chips, one or more storage interfaces 106, such as sixteen SATA connectors (4 per node), one or more SD slots (one per node, MMC not supported) and one or more SPI flash chips (1 per node). The quad node card may be powered by 12V dc, supplied via edge connectors 108—all other voltages are internally generated by regulators. The quad node card may have server interconnect Fabric connections 110 routed via the edge connector 108, through a system board to which the node card is connected, to other node cards or external Ethernet transceivers and I2C and GPIO rout via the edge connector, per system board requirements. The quad node card 100 does not have ethernet PHY transceivers in some implementations, other implementations may choose to use Ethernet transceivers on the node card and route this as the interconnect and the node card is not a stand alone design, but may be used with a system board.

The quad Card example consists of 4 server nodes, each formed by a Calxeda® EnergyNode SoC, with its DIMM and local peripherals, which runs Linux independently from any other node. By design, these nodes can be directly interconnected to form a high bandwidth fabric, which provides network access through the system Ethernet ports. From the network view, the server nodes appear as independent servers; each available to take work on.

Figure 4:
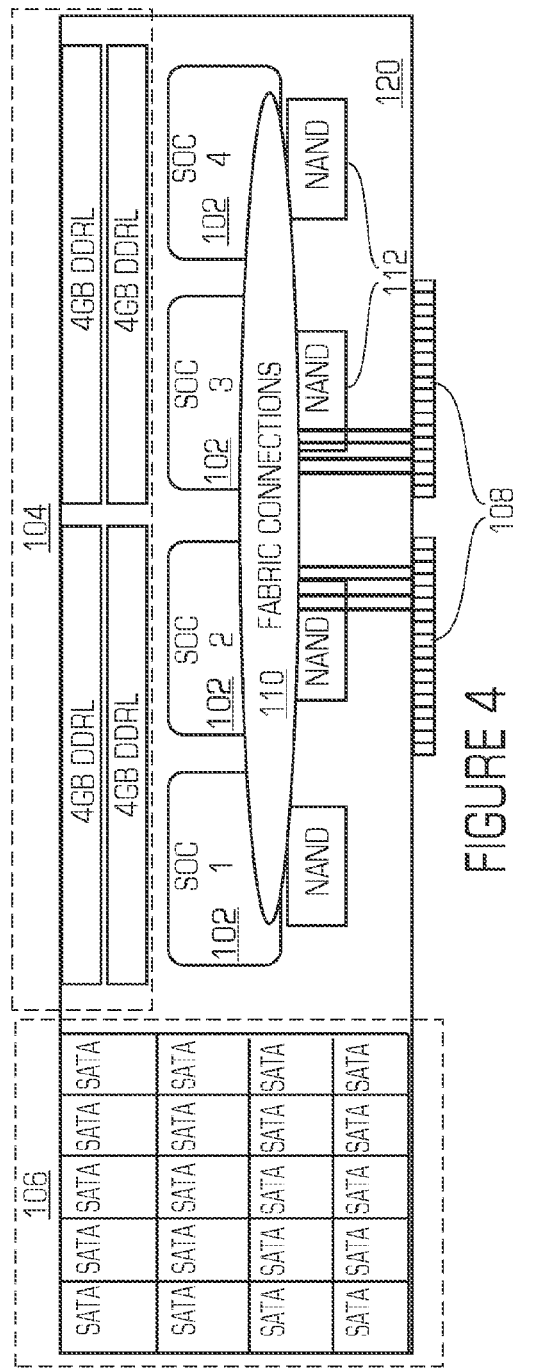
FIGS. 4 and 5 illustrate two examples of node cards with one or more connectors.
Figure 5:
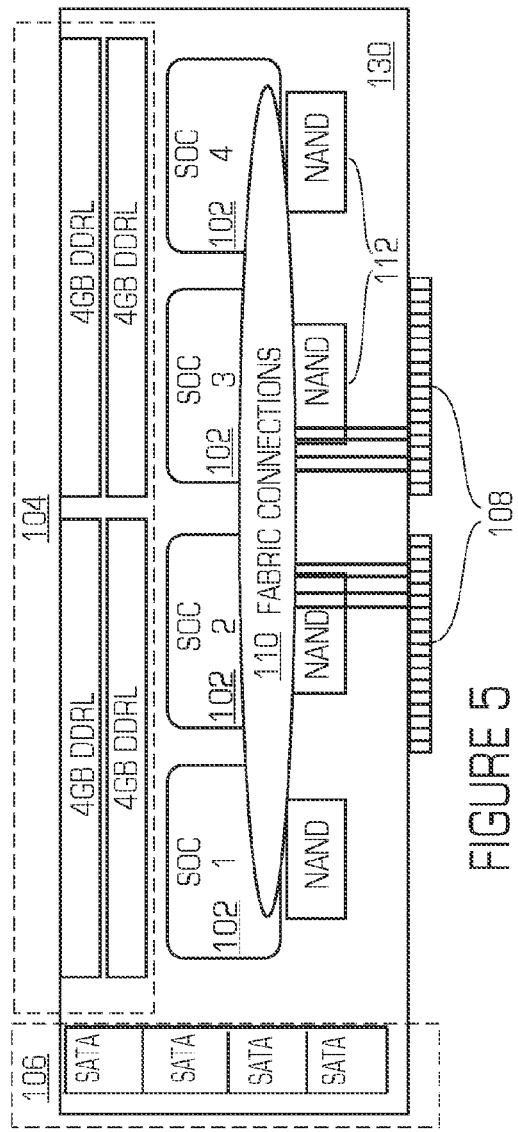

FIGS. 4 and 5 illustrate two examples of node cards 120, 130 with one or more connectors 108. The connectors may be a PCIe connector that makes a convenient physical interconnect between the node card and the system board, but any type of connector can be used. The connector type is selected based on its performance at the switching frequency of the fabric interconnect. For example, industry-standard Micro TCA connectors available from Tyco Electronics and Samtec operate up to 12 GHz. In the examples in FIGS. 4 and 5, the node card has the SOCs 102, the memory 104, the storage interfaces 106 and the fabric connector 110, but may also include one or more persistent memory devices 112, such as NAND flash. The node card definition can vary as seen below with variation in a number of SATA connectors and/or in a number of fabric interconnect for server to server communication. The type of PCIe connector in the node card could vary significantly based on quantity of interconnect and other signals desired in the design. FIGS. 4 and 5 shows two PCIe x16 connectors, but the node cards could vary using any quantity of PCIe connector and any type of PCIe (x1, x2, x4 etc. . . . ). Though not shown in FIG. 4 or 5 for brevity, since fabric connectivity exists with the node cards, the physical Ethernet interfaces depicted on the System Board 42 can also reside on the node cards.

Figure 6:
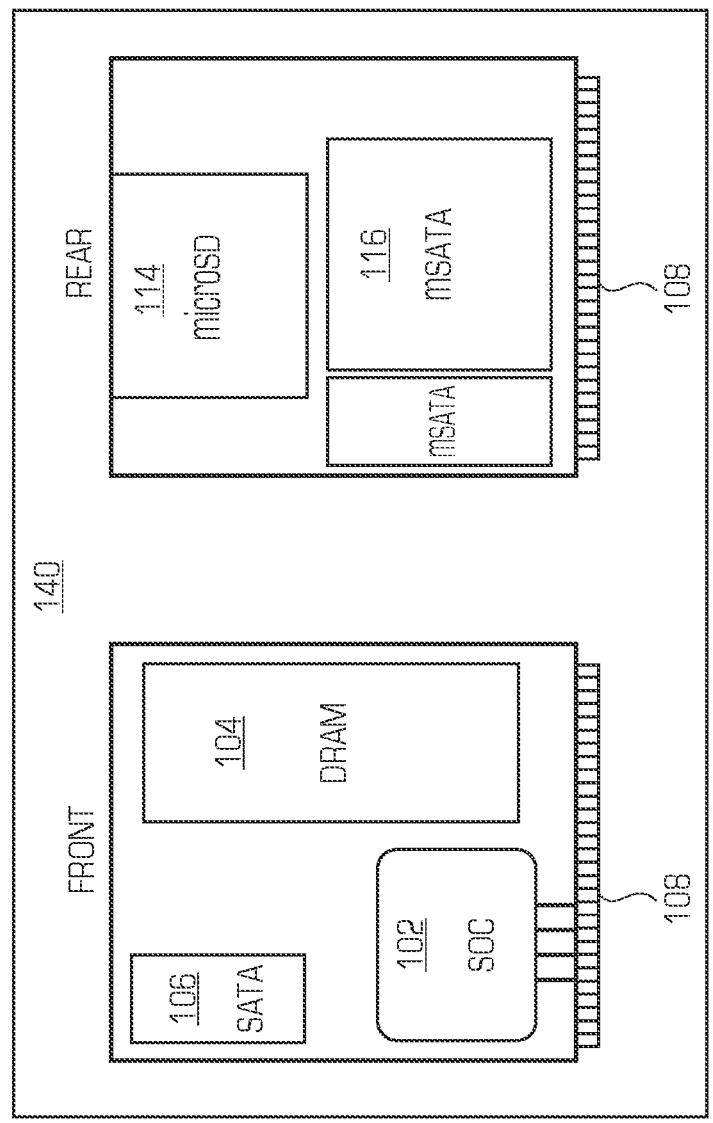
FIG. 6 illustrates an example of a single server node card.

FIG. 6 illustrates an example of a single server node card 140. The single server node card 140 may have one processor SoC 102, a 4 GB DDR3 DRAM 104 down (no DIMM), a microSD slot 114, a SATA data connector 106, a mSATA connector 116, one or more XAUI channels (four in this example) to the edge connector 108 for fabric connectivity and may be smaller than 2"×4". This combination provides the compute, networking IO, system memory, and storage interfaces needed for a robust ARM server, in a form factor that is easily integrated into many chassis designs. This node card implements a x16 PCI connector with a custom electrical signaling interface that follows the Ethernet XAUI interface definition. The node card 140 may be a two-sided printed circuit board with components on each side as shown in FIG. 6.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A node card, comprising:
   a substrate having a connector that communicates a plurality of signals between the substrate and an outside entity;
   at least two nodes connected to the substrate, wherein the at least two nodes receive power from one or more first signals communicated over the connector and communicate with the outside entity using one or more second signals communicated over the connector; and
   one or more level shifters that translate a signal on the connector to a signal applied to at least one of the at least two nodes;
   wherein at least one of the plurality of signals is configured to arbitrate usage of a serial port on the node card by the at least two nodes.

2. The node card of claim 1, wherein the connector is a peripheral component interconnect express (PCIe) connector.

3. The node card of claim 2, wherein the PCIe connector is one of a PCIe x1 connector, a PCIe x2 connector, a PCIe x4 connector, a PCIe x8 connector a PCIe x16 connector, and a PCIe x32 connector.

4. The node card of claim 1, wherein the substrate is a printed circuit board.

5. The node card of claim 1, wherein the plurality of signals includes an enable signal that, upon assertion, enables the one or more nodes.

6. The node card of claim 1, further comprising one or more regulators connected to the substrate, wherein each regulator receives power from one or more third signals communicated over the connector and provides a regulated voltage to the one or more nodes.

7. The node card of claim 6, wherein the plurality of signals includes an enable signal that enables the one or more regulators.

8. The node card of claim 1, wherein each node is a server.

9. The node card of claim 8, wherein each server further comprises a system on a chip (SOC), a memory, and a regulator.

10. The node card of claim 9, wherein the memory is one of a dynamic random access memory (DRAM) and a dual in-line memory module (DIMM), and wherein the memory is connected to the substrate and electrically connected to the SOC.

11. The node card of claim 9, wherein each server has a clock generator chip.

12. The node card of claim 9, wherein each server has a temperature sensor that is electrically connected to the SOC.

13. The node card of claim 9, wherein each server has a nonvolatile memory electrically connected to the SOC.

14. The node card of claim 13, wherein the nonvolatile memory is one of a storage card, NAND flash, NOR flash, and serial flash.

15. The node card of claim 9, wherein each SOC has a heat sink.

16. The node card of claim 9, further comprising one or more serial advanced technology attachment (SATA) connectors, and wherein a set of signals is routed from the SOC to the one or more SATA connectors.

17. The node card of claim 16, wherein the set of signals is routed from the one or more SATA connectors through the connector.

18. The node card of claim 9, wherein the connector communicates a set of direct current (DC) values for one of set-up, control, identification, and information.

19. The node card of claim 18, wherein each SOC has as set of general purpose input/output (GPIO) pins, and wherein the set of DC values is routed to the GPIO pins.

20. The node card of claim 9, wherein the connector communicates an alternative boot signal to the SOC to enable an alternative boot by the SOC.

21. The node card of claim 9, wherein the connector communicates at least one signal to interrupt the SOC.

22. The node card of claim 9, wherein the connector communicates a signal from the SOC to communicate with the outside entity.

23. The node card of claim 1, further comprising one or more communication paths between the one or more nodes and the outside entity, wherein the one or more communication paths are XAUI, and wherein the one or more communication paths are routed to the connector.

24. The node card of claim 1, further comprising one or more communication paths between the one or more nodes and the outside entity, wherein the one or more communication paths are serial gigabit media independent interface (SGMII), and wherein the one or more communication paths are routed to the connector.

25. The node card of claim 1, further comprising a mini serial advanced technology attachment (SATA) connector.

26. The node card of claim 1, wherein the connector is one of a peripheral component interconnect express (PCIe) x1 connector, a PCIe x2 connector, a PCIe x4 connector, a PCIe x8 connector a PCIe x16 connector, and a PCIe x32 connector.

27. The node card of claim 1, wherein the connector communicates a set of joint test action group (JTAG) signals to the one or more nodes.

28. The node card of claim 1, wherein the connector communicates at least one serial port signal and one or more universal asynchronous receiver/transmitter (UART) signals to the one or more nodes.

29. The node card of claim 1, further comprising an ethernet transceiver that acts as an interconnect between the one or more nodes.

* * * * *